United States Patent [19]

Daitoku

[11] Patent Number: 5,389,988
[45] Date of Patent: Feb. 14, 1995

[54] TRIMMING CAMERA

[75] Inventor: Koichi Daitoku, Sagamihara, Japan

[73] Assignee: Nikon Corporation, Tokyo, Japan

[21] Appl. No.: 949,351

[22] Filed: Sep. 23, 1992

Related U.S. Application Data

[63] Continuation of Ser. No. 802,729, Dec. 5, 1991, abandoned, which is a continuation-in-part of Ser. No. 525,709, May 21, 1990, abandoned.

[30] Foreign Application Priority Data

May 22, 1989 [JP] Japan .................................. 1-128341
Dec. 10, 1990 [JP] Japan .................................. 2-401094

[51] Int. Cl.⁶ .............................................. G03B 17/24
[52] U.S. Cl. .................................. 354/106; 354/195.12
[58] Field of Search ...................... 354/105, 106, 195.1, 354/195.12, 94

[56] References Cited

U.S. PATENT DOCUMENTS

| | | | |
|---|---|---|---|
| 4,583,831 | 4/1986 | Harvey | 354/106 |
| 4,678,299 | 7/1987 | Harvey | 354/21 |
| 4,860,037 | 8/1989 | Harvey | 354/21 |
| 5,057,857 | 10/1991 | Hata et al. | 354/106 |

Primary Examiner—David M. Gray
Attorney, Agent, or Firm—Shapiro and Shapiro

[57] ABSTRACT

A trimming camera in which, in response to setting of a trimming mode, trimming photography (pseudo panorama or pseudo telephoto) is established and trimming information is recorded. In one embodiment a variable focal length lens is driven to a shortest or longest focal length in response to the setting of a trimming mode. In another embodiment, a conversion lens is placed in the optical path of a photographic lens in response to the setting of a trimming mode, and trimming information is recorded.

23 Claims, 11 Drawing Sheets

TRIMMING CAMERA

This is a continuation of application Ser. No. 802,729, filed Dec. 5, 1991, which is a continuation-in-part of application Ser. No. 525,709, filed May 21, 1990, both now abandoned.

BACKGROUND OF THE INVENTION

Field of the Invention

The present invention relates to a trimming camera in which trimming information is recorded to control a printer in order to obtain a pseudo panorama photograph or a pseudo telephoto photograph.

Related Background Art

A trimming camera is disclosed in U.S. Pat. No. 4,678,299 in which, in order to photograph in a trimming photography mode, a manual operating member (zoom ring) must be adjusted to an initial extent necessary to bring a variable focal length lens to a shortest or longest focal length, and to a further extent necessary to set the trimming mode. This procedure is cumbersome.

SUMMARY OF THE INVENTION

An object of the present invention is to provide an improved trimming camera which does not require such a procedure. More particularly, in accordance with the present invention a trimming mode is selected irrespective of the focal length of the lens, and trimming mode photography is established automatically in response to the selection of the trimming mode.

In one embodiment of the invention a variable focal length lens is driven to a shortest focal length or a longest focal length in response to the setting of a trimming mode, and trimming information is recorded in response to the setting of the trimming mode.

In another embodiment, when a wide-conversion lens or a tele-conversion lens is inserted in an optical path of a photographing lens in response to the setting of a corresponding trimming mode, trimming information is recorded.

By virtue of the invention, photography in a desired trimming mode is achieved simply and quickly, so that a photograph opportunity is not lost.

DESCRIPTION OF THE PREFERRED EMBODIMENTS

Figure 1:
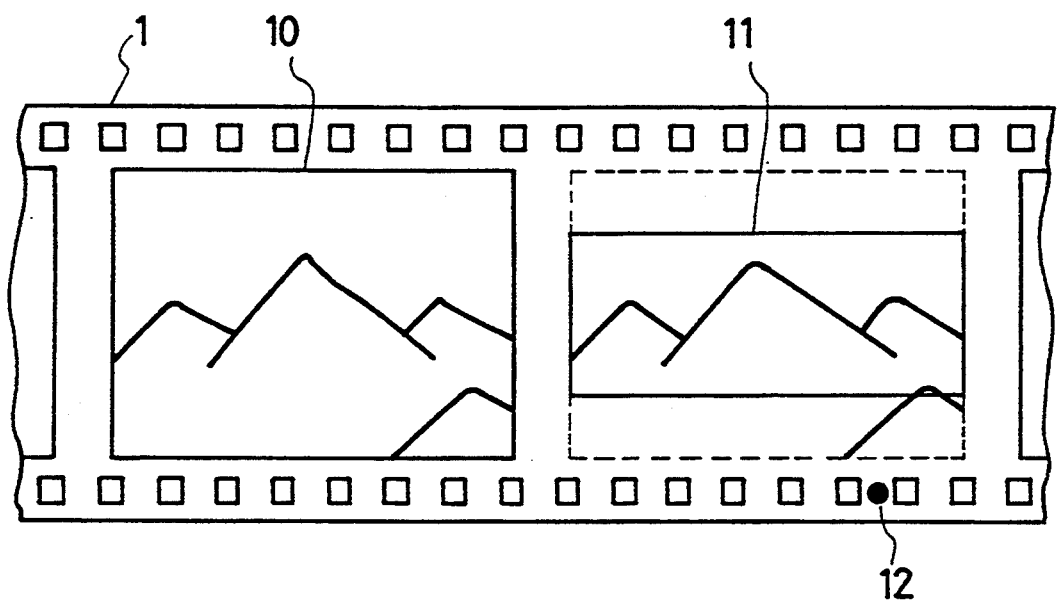
FIGS. 1 and 2 are plan views showing film photographed by a camera of a first embodiment of the invention.

On the film 1 of FIG. 1 are formed the ordinary photo image plane 10 photographed in the state where a zoom lens is set at the shortest focal length, and the pseudo panorama photo image plane 11. The upper and the lower part of the pseudo panorama photo image plane 11 surrounded by a dotted line are trimmed at the time of printing to produce the pseudo panorama photograph with the longer lateral length. The image planes 10 and 11 photograph the same scenery. In between the perforations at the lower part of photo image plane 11 is recorded the pseudo panorama information 12 which indicates that the photo image plane 11 above is the image plane to be printed in pseudo panorama mode.

Figure 2:
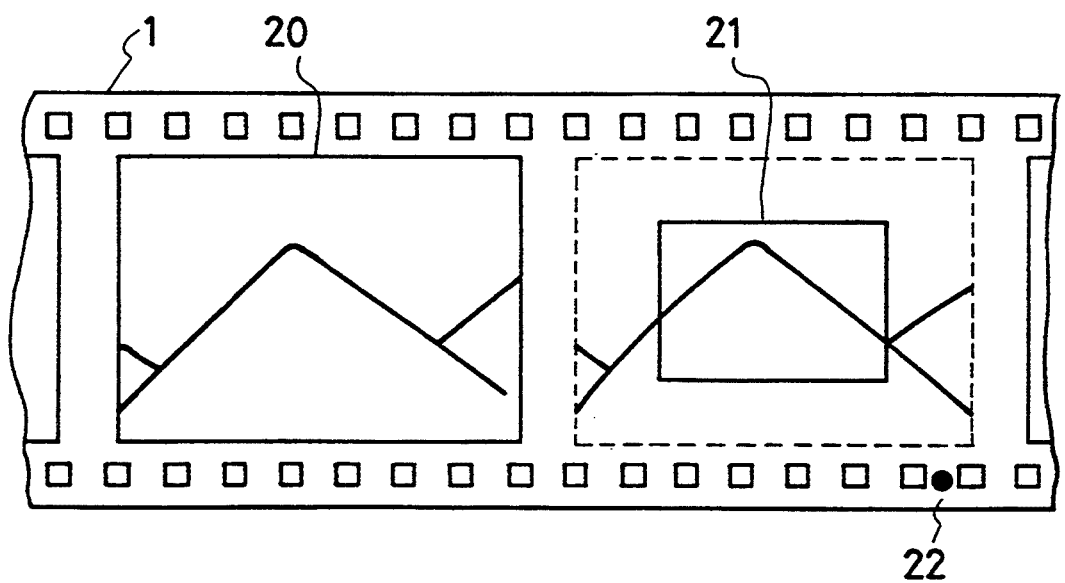

On the film 1 of FIG. 2 are formed the ordinary photo image plane 20 photographed in the state where the zoom lens is set at the longest focal length and the pseudo telescopic photo image plane 21. The peripheral part of the pseudo telescopic photo image plane 21 surrounded by a dotted line is trimmed at the time of printing to provide the pseudo telescopic photograph. The image planes 20 and 21 photograph the same scenery. Between the perforations at the lower part of the photo image plane 21 is recorded the pseudo telescopic information 22 which indicates that the photo image plane 21 at above is the image plane to be printed in pseudo telescopic mode, at a position separate from the position where pseudo panorama information 12 is recorded.

Figure 3:
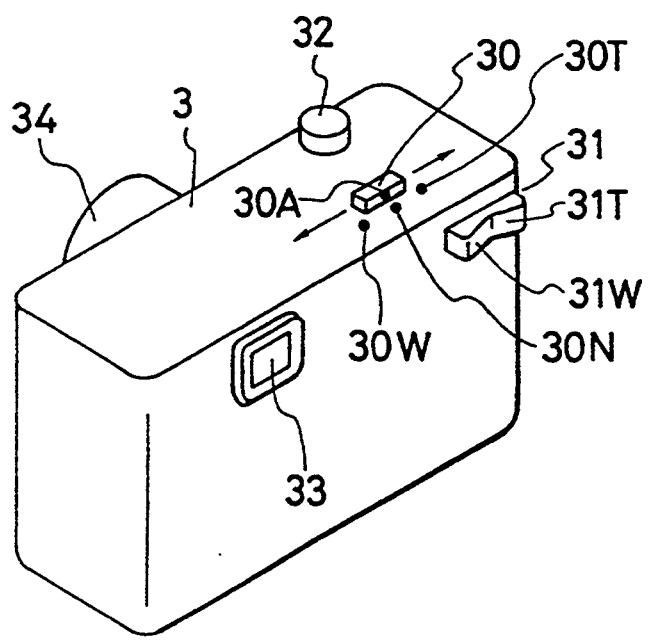
FIG. 3 is a perspective view of the camera of the first embodiment.

FIG. 3 is a perspective view of the camera 3 of a first embodiment of the present invention viewed from behind. At the upper plane of this camera 3 is installed a photo image plane mode switching member 30. An indicator 30A is provided at the rear side of this switching member 30 and when this indicator 30A is made to face a indicator 30N at the upper plane, the mode is set at the ordinary mode where the ordinary photo image plane 10 of FIG. 1 or ordinary photo image plane 20 of FIG. 2 can be photographed. When-indicator 30A is made to face an indicator 30W, the mode is set at pseudo panorama mode where pseudo panorama photo image plane 11 of FIG. 1 can be photographed. When the indicator 30A is made to face an indicator 30T, the mode is set at pseudo telescopic mode where the pseudo telescopic photo image plane 21 of FIG. 2 can be photographed.

At the front side of camera 3 is provided the zoom lens 34.

At the back side of camera 3 is provided a zoom operating member 31. When its left side 31W is depressed, zoom lens 34 zooms down as long as it is depressed and when the right side 31T is depressed, the zoom lens 34 zooms up as long as it is depressed.

Figure 4:
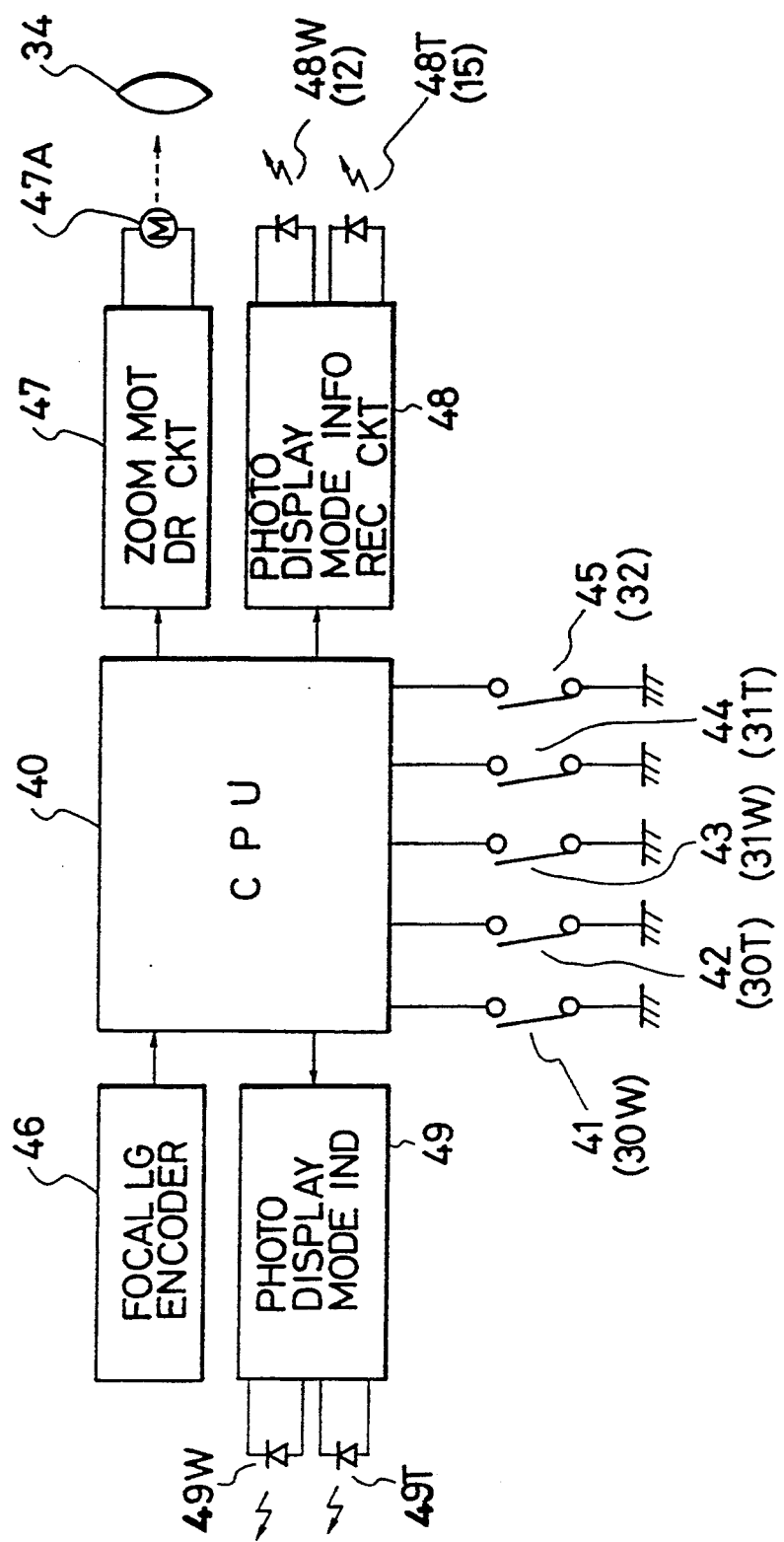
FIG. 4 is a circuit/block diagram of the first embodiment.

At the upper side of camera 3 is a release button 32 to start photography and at the back is ocular section 33 of a finder. FIG. 4 is a circuit/block diagram showing part of the embodiment which relates to the present invention. The central control circuit (CPU) 40 coordinates and controls the operation of camera 3.

At the input port of this CPU 40 are connected 5 switches 41–45 and focal length encoder 46.

Switch 41 turns ON when the indicator 30A of switching member 30 of FIG. 3 is made to face the indicator 30W and generates the signal to set pseudo panorama mode. Switch 42 turns ON when the indicator 30A of switching member 30 is made to face the indicator 30T and the signal to set the pseudo telescopic mode is generated.

Switch 43 turns ON when the left side 31W of zoom operating member 31 of FIG. 3 is depressed, generating the signal to execute zooming down. Switch 44 turns ON when the right side 31T of zoom operating member 31 is depressed and the signal to execute zooming up is generated. Switch 45 turns ON when the release button 32 is depressed generating the signal to start photographic action.

Focal length encoder 46 generates focal length information which indicates at which focal length the zoom lens 34 is set.

To output ports of CPU 40 are connected the zoom motor drive circuit 47, photo image plane mode information recording circuit 48 and photo image plane mode indicating circuit 49.

A zoom motor 47A is connected to the zoom motor drive circuit 47. Drive circuit 47 turns the motor 47A forward or reverse in response to the control signal given by CPU 40 and thus zooms the zoom lens 34.

Light emitting diode 48W and 48T are connected to the photo display mode information recording circuit 48. Recording circuit 48 lights up the light emitting diode 48W as photography proceeds in the pseudo panorama mode, and records the pseudo panorama information 12 of FIG. 1 on the film 1, and lights up the light emitting diode 48T as photography proceeds in the pseudo telescopic mode and records the pseudo telescopic information 22 of FIG. 2 on film 1.

Light emitting diodes 49W and 49T are connected to photo image plane mode indicating circuit 49. Indicating circuit 49 lights up the photo emitting diode 49W when pseudo panorama mode is set, or lights up light emitting diode 49T when pseudo telescopic mode is set, in response to the control signal given by CPU 40. The two light emitting diodes 49W and 49T are installed at a position where they can be observed at ocular section 33 of the finder so that it is possible to check the photo image plane mode that is set simply by viewing through ocular section 33 of the finder.

Figure 5:
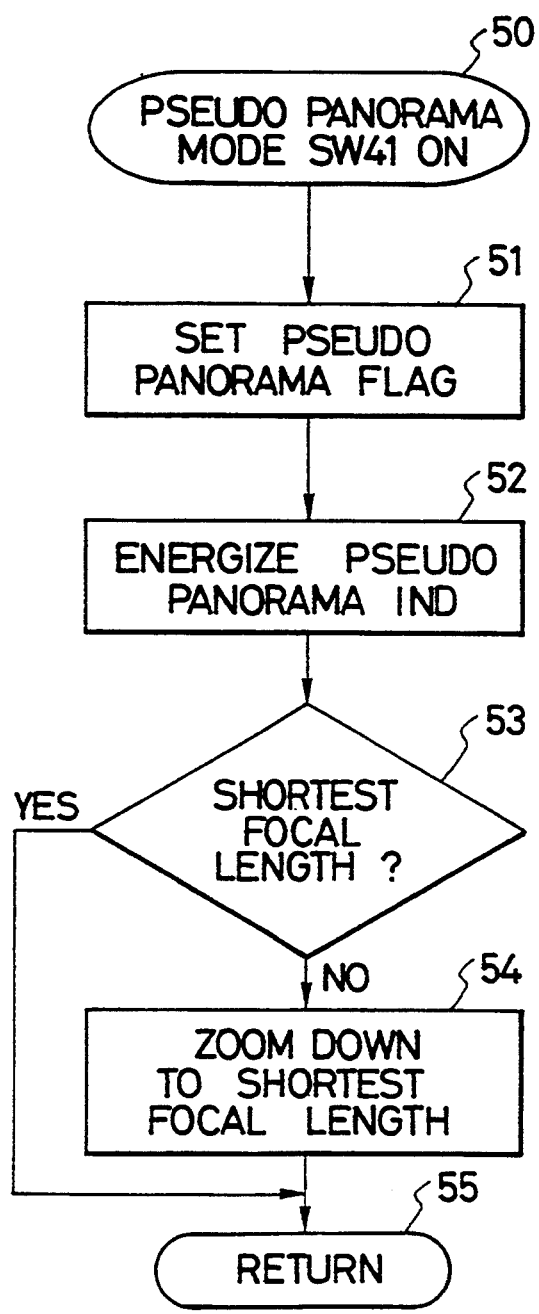
FIGS. 5, 6, and 7 are flow charts showing the operation of the first embodiment.
Figure 6:
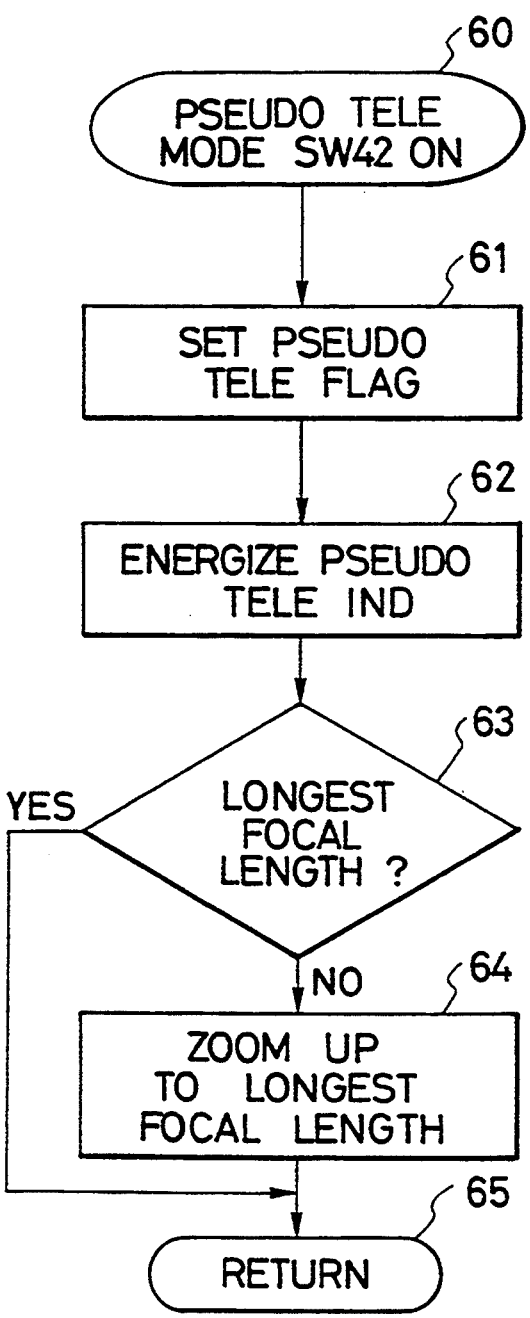
Figure 7:
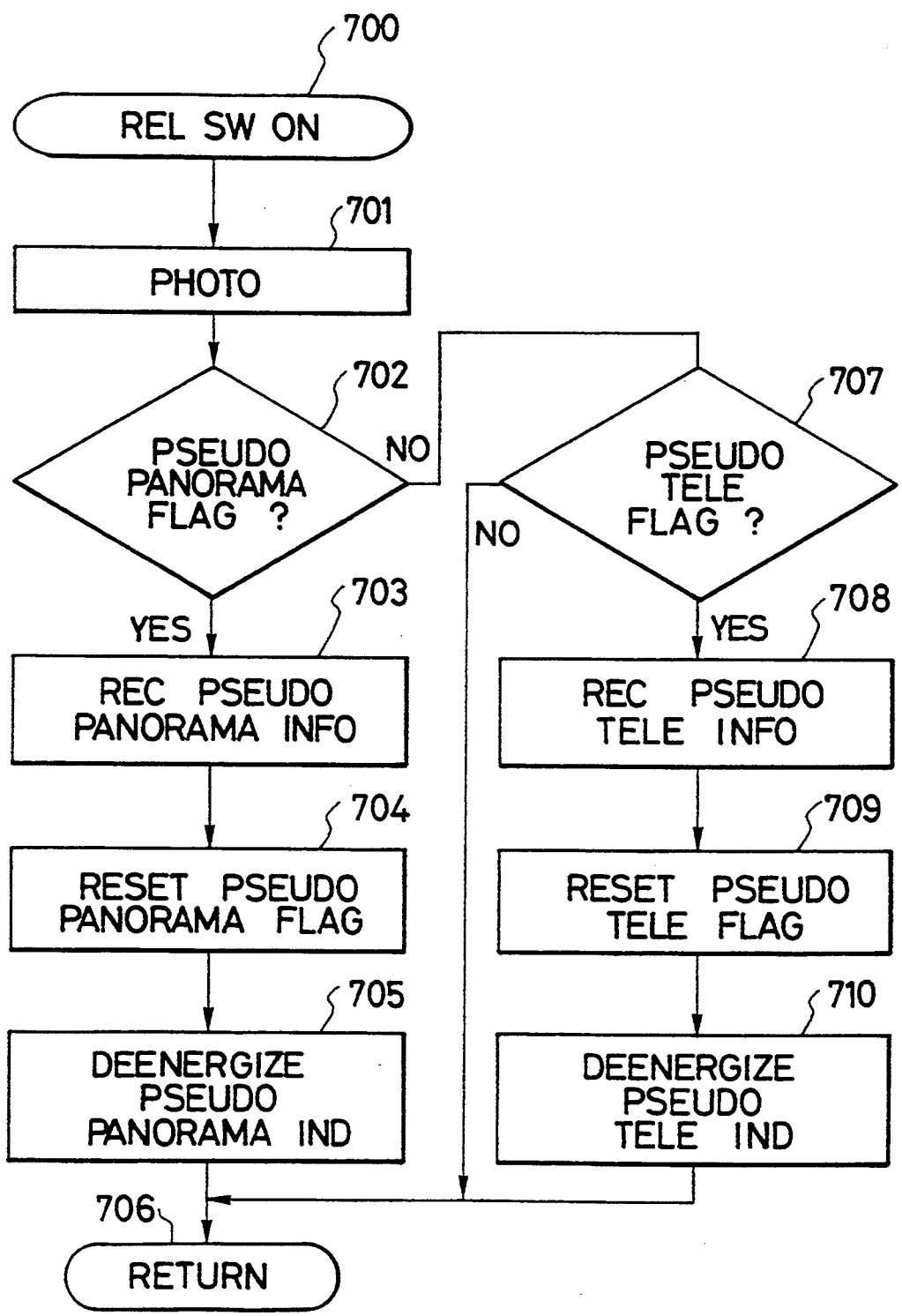

Next the operation of the present embodiment controlled by CPU 40 is explained in reference to the flow charts of FIGS. 5-7. Ordinary zooming motion performed by the operation of zoom operating member 31 is not shown in the flow chart as it is conventional. The zooming motion is so carried out that when the left side 31W of zoom operating member 31 is depressed, switch 43 turns ON, zoom motor 47A turns forward via zoom motor drive circuit 47 and zoom lens 34 is zoomed down toward 2 the position of the shortest focal length. Such zooming down motion continues as long as the left side 31W is depressed, i.e., the switch 43 stays 0N and the lens reaches the position of the shortest focal length. When it reaches the position of the shortest focal length, the electrification of motor 47A discontinues even when the switch 43 is ON.

Likewise, when the right side 31T of zoom operating member 31 is depressed, switch 44 turns ON, zoom motor 47A turns in reverse via the zoom motor drive circuit 47 and zoom lens 34 is zoomed up toward the position of the longest focal length. Such zooming up motion continues as long as the right side 31T is depressed i.e., the switch 44 is ON. When the lens reaches the position of the longest focal length, electrification of motor 47A discontinues even when the switch 44 is ON.

The flow chart of FIG. 5 indicates the operation for setting the pseudo panorama mode. This operation starts when the indicator 30A of the switching member 30 is made to face the indicator 30W and switch 41 is turned ON (step 50).

At the succeeding step 51, a flag to indicate that the mode is set at the pseudo panorama mode is set in the memory inside the CPU 40 and the operation proceeds to step 52.

At step 52, the light emitting diode 49W is lighted via the photo image plane mode indicating circuit 49 to indicate that the mode is set at the pseudo panorama mode.

At the following step 53 whether the zoom lens 34 is at the position of the shortest focal length or not is judged from the focal length information given by the focal length encoder 46. When the zoom lens 34 is at the position of the shortest focal length, the step skips to step 55 while if the lens is not at the shortest focal length, the step proceeds to the next step 54.

At step 54, zoom lens 34 is zoomed down via zoom motor drive circuit 47 and zoom motor 47A until zoom lens 34 reaches the position of the shortest focal length. When the focal length information to indicate that the zoom lens 34 has reached the position of the shortest focal length is obtained in reference to the focal length information of focal length encoder 46, zooming down of the lens stops and the operation proceeds to step 55.

At step 55, the operation returns to the main routine (not shown) and the action of this flow chart ends.

Flow chart of FIG. 6 indicates the setting operation of the pseudo telescopic mode. This operation starts when the indicator 30A of switching member 30 is made to face the indicator 30T and the switch 42 is turned ON (step 60).

At the following step 61, a flag to indicate that the mode has been set at the pseudo telescopic mode is set in the memory of CPU 40 and the operation proceeds to step 62.

At step 62, the light emitting diode 49T is lighted via the photo image plane mode indicating circuit 49 to indicate that the mode is set at the pseudo telescopic mode.

At the following step 63, whether the zoom lens is at the position of the longest focal length or not is judged by the focal length information given by focal length encoder 46. When the zoom lens 34 is at the position of the longest focal length, the operation skips to step 65 and if the lens is not at the position of the longest focal length, it proceeds to the next step 64.

At step 64, zoom lens 34 is zoomed up until it reaches the position of the longest focal length via zoom motor drive circuit 47 and zoom motor 47A. When the focal length information to indicate that zoom lens 34 has reached the position of the longest focal length in reference to the focal length information of focal length encoder 46 is obtained, zooming up of the lens stops and the operation proceeds to step 65.

At step 65, the operation returns to the main routine (not shown) and the operation of this flow chart ends.

The flow chart of FIG. 7 indicates the photographic operation and the pseudo panorama or pseudo telescopic information recording operation to be accompanied by such photographic operation. This operation starts when the switch 45 is turned ON by depressing the release button 32 (Step 700).

At the following step 701, selection of diaphragm, shutter speed or the like function to take a photograph on film 1 is performed.

At step 702, judgment is made if there exists pseudo panorama flag or not and if it does, the operation proceeds to the next step 703 and if not, it skips to the next step 707.

At step 703, light emitting diode 48W is lighted via the photo display mode information recording circuit 48 and pseudo panorama information 12 is recorded on film 1.

At the following step 704, the pseudo panorama flag is reset and the operation proceeds to step 705.

At step 705, the light emitting diode 49W which has been indicating that the mode is at the pseudo panorama mode via photo image plane mode indicating circuit 49 is deenergized and the operation proceeds to step 706.

At step 706, the operation returns to the main routine (not shown) and the operation of his flow chart ends.

At step 707, judgement is made whether there exists the pseudo telescopic flag or not and if it does, the operation proceeds to the following step 708 and if not, it skips to the step 706 to end the operation.

At step 708, light emitting diode 48T is lighted via the photo image plane mode information recording circuit 48 and the pseudo telescopic information 22 is recorded on film 1.

At the succeeding step 709, the pseudo telescopic flag is reset and the operation proceeds to step 710. At step 710, the light emitting diode 49T which has been indicating that the mode is at the pseudo telescopic mode is deenergized via photo display mode indicating circuit 49 and then the operation proceeds to step 706 to end the operation of this flow chart.

According to the aforesaid embodiment, setting of the pseudo panorama mode or the pseudo telescopic mode and zooming of lens 34 to the position of the shortest to the longest focal length are realized only by a single operation to turn ON the switch 41 or 42 and therefore the operability is excellent and missing a photograph opportunity is avoided.

In the above embodiment, switches 41 and 42 for setting the photo image plane mode and switches 43 and 44 for control of zooming are separately provided but it is possible to have the switch 43 or 44 concurrently perform the function of the switch 41 or 42 and thereby to eliminate the switches 41 and 42. For that purpose, it is so designed that the pseudo panorama mode or pseudo telescopic mode are set when the switch 43 or 44 repeats ON-OFF more than twice in about one second.

Figure 8:
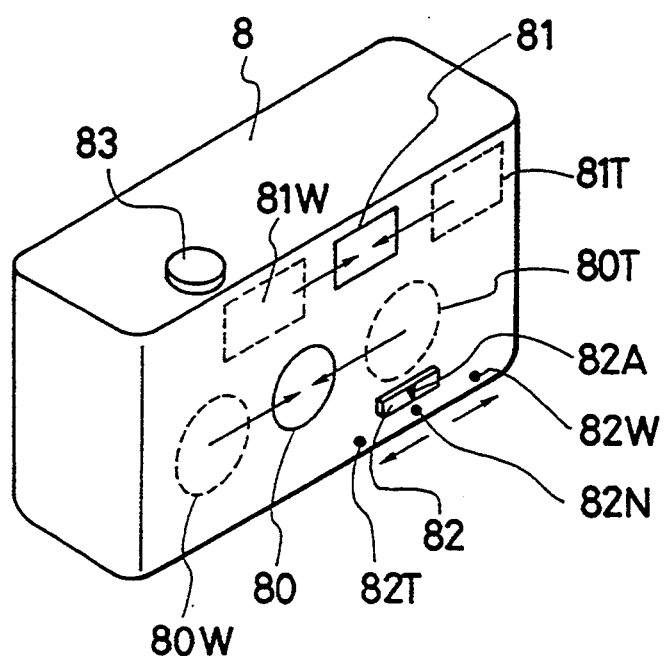
FIG. 8 is a perspective view of a camera of a second embodiment of the invention.

FIG. 8 is a perspective view of the camera 8 which is the second embodiment of a present invention.

At the front of the camera 8 are installed a single focus photographic lens 80, objective window 81 of the finder and the photo image plane mode switching member 82.

At the right and left sides of photographic lens 80 are wide conversion lens 80W and tele-conversion lens 80T.

At the right and left sides of objective window 81 of the finder are wide conversion lens 81W and tele-conversion lens 81T.

Indicator 82A is provided at the front plane of the switching member 82. When this indicator 82A is made to face an indicator 82N at the front of the camera, the mode is set at the ordinary mode.

When indicator 82A is moved to the position to face an indicator 82W, the mode is set the at the pseudo panorama mode and the wide-conversion lens 80W is inserted at the front of photographing lens 80 and thus photographing lens 80 is made into a wide angle lens, while the wide-conversion lens 81W is also inserted at the rear side of objective window 81 of the finder and the photographing angle of the finder is widened to the extent proportional to the widening of the angle of photographic lens 80.

Such setting of the pseudo panorama mode is realized by the series of steps of the flow chart of FIG. 5 eliminating steps 53 and 54.

When the indicator 82A is made to face an indicator 82T, the mode is set at the pseudo telescopic mode and at the same time, tele-conversion lens 80T is inserted at the front side of photographing lens 80 to make the lens 80 telescopic, while tele-conversion lens 81T is inserted at the rear side of the objective window 81 of the finder to narrow the photographing angle of the finder to an extent proportional to the telescopic focal length of the lens 80.

Such setting of the pseudo telescopic mode is performed by the series of steps of the flow chart of FIG. 6 eliminating the steps 63 and 64.

At the upper plane of camera 8 is provided a release button 83.

The photographic operation of this camera is similar to that indicated in the flow chart of FIG. 7 and there 10 fore its explanation is omitted here.

According to the present embodiment, the pseudo panorama mode or pseudo telescopic mode is set automatically by a single operation to insert the wide-conversion lens 80W, which changes over the focal length to wide angle, or tele-conversion lens 80T, which changes over the focal length to telescopic length, into the photographic light path, and thereafter simply by the usual photographing, the information required for obtaining a pseudo panorama photograph or a pseudo telescopic photograph is recorded.

As stated above, with the camera (3) of the first embodiment, setting of the zoom lens at the shortest or the longest focal length and setting of the pseudo panorama or pseudo telescopic mode can be effected by a single operation at whatever focal length the zoom lens may be set.

With the camera (8) of the second embodiment, the mode is automatically set at the pseudo panorama mode or pseudo telescopic mode by a single operation to insert the wide-conversion lens, to changeover the focal length to wide angle, or the tele-conversion lens, to changeover the focal length to telescopic length, into the photographing light path.

In the aforesaid two embodiments, the operation is simple and quick and a photograph opportunity is not missed due to lengthy operation.

Figure 9:
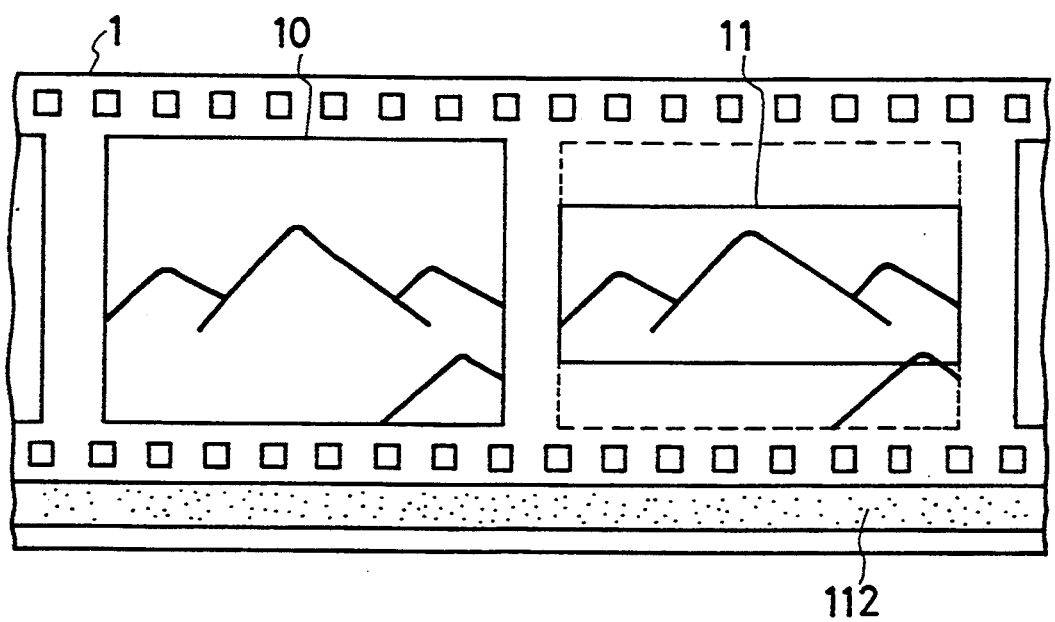
FIGS. 9 and 10 are plan views showing film photographed in accordance with a third embodiment of the invention.
Figure 10:
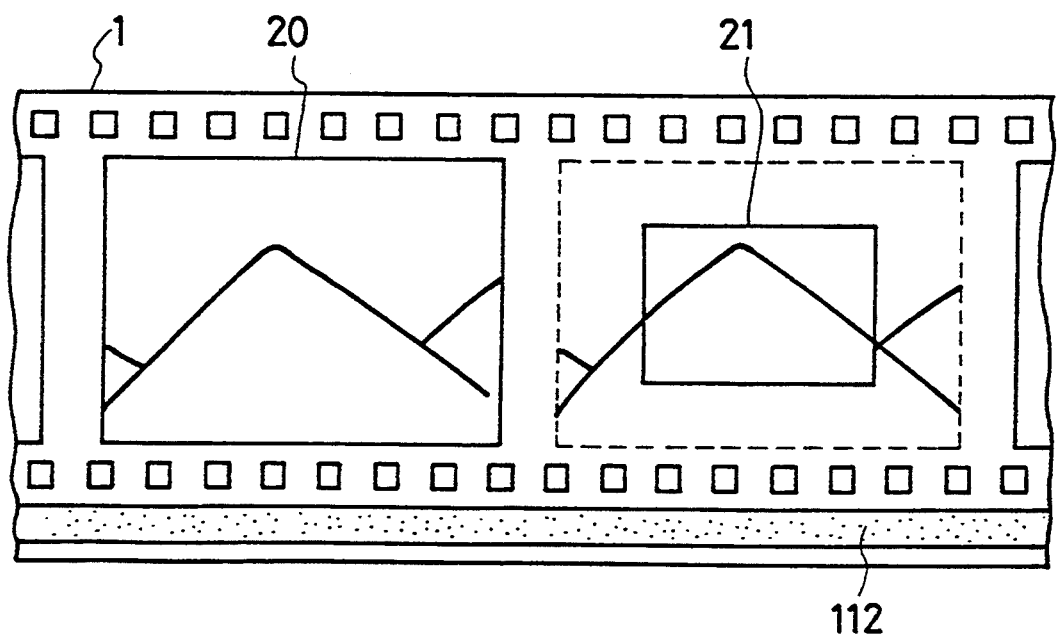

FIGS. 9 and 10 are plan views of the film photographed by the camera of the third embodiment of the present invention. The same parts as those of FIGS. 1 and 2 are given the same symbols. In FIGS. 9 and 10, a magnetic layer 112 is applied to the lower part of the total photo image plane of film 1. Magnetic layer 112 can be freely magnetized or demagnetized. Since the magnetic layer per se is known, its details are not introduced here.

Figure 11:
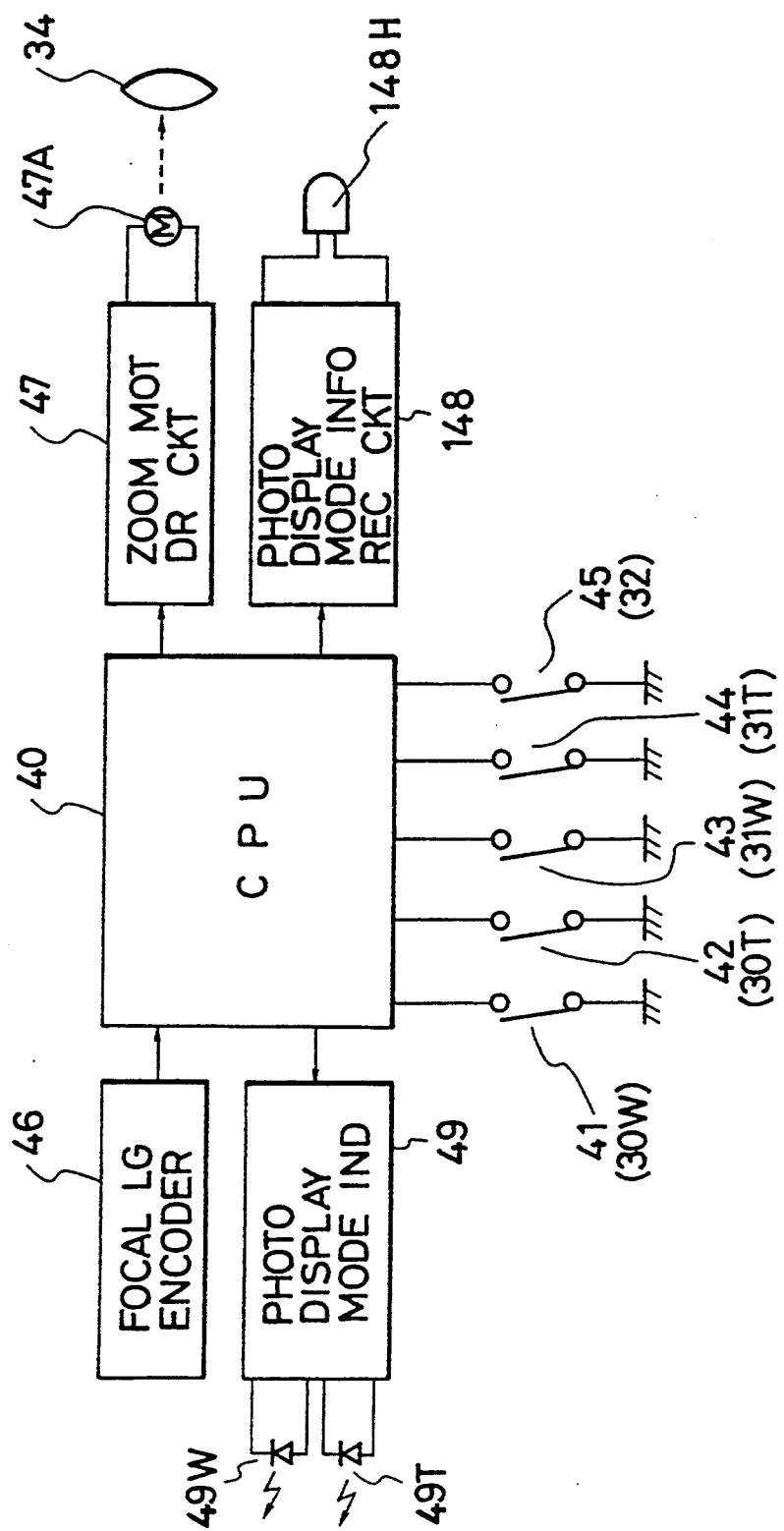
FIG. 11 is a circuit/block diagram of the third embodiment.

FIG. 11 is a circuit/block diagram of the third embodiment of the present invention. The same parts as those of FIG. 4 are given the same symbols and their details are not introduced here. Magnetic head 148H is connected to the photo image plane mode information recording circuit 148. Magnetic head 148H is so designed that it faces the magnetic layer 112 when film 1 (FIG. 9) is advanced in the camera. The recording circuit 148 drives magnetic head 148H as photography proceeds in the pseudo panorama mode in response to the control signal coming from CPU 40 and inputs information, for example "0", into the magnetic layer 112 at the lower part of the photo image plane 11 to indicate that photographing was in the pseudo panorama mode.

In FIG. 10, the system is so designed that information, for example "1", is entered by magnetic head 148H into the magnetic layer 112 at the lower part of the pseudo telescopic photo image plane 21 of film 1, to indicate that photographing was in such mode. At the time of film development, the registered information is read from the magnetic layer 112 and if such information is "0", the upper and lower part of the frame are trimmed so that a pseudo panorama image plane is obtained and if such information is "1", the peripheral part of the frame is trimmed so that a pseudo telescopic image plane is obtained.

In FIG. 7, 701 may be set after the steps 705 and 710 and the steps of 702-705 and 707-710 may be conducted in parallel (simultaneously) with the photographic step of 701.

In the embodiments described above, trimming information is entered into the film by switching the mode switch at every photographing operation, but the camera may be so designed that the entire film is photographed first and then while rewinding the film, the information may be entered at the corresponding places (for example, at the lower part of the pseudo panorama or pseudo telescopic photo image plane).

Figure 12:
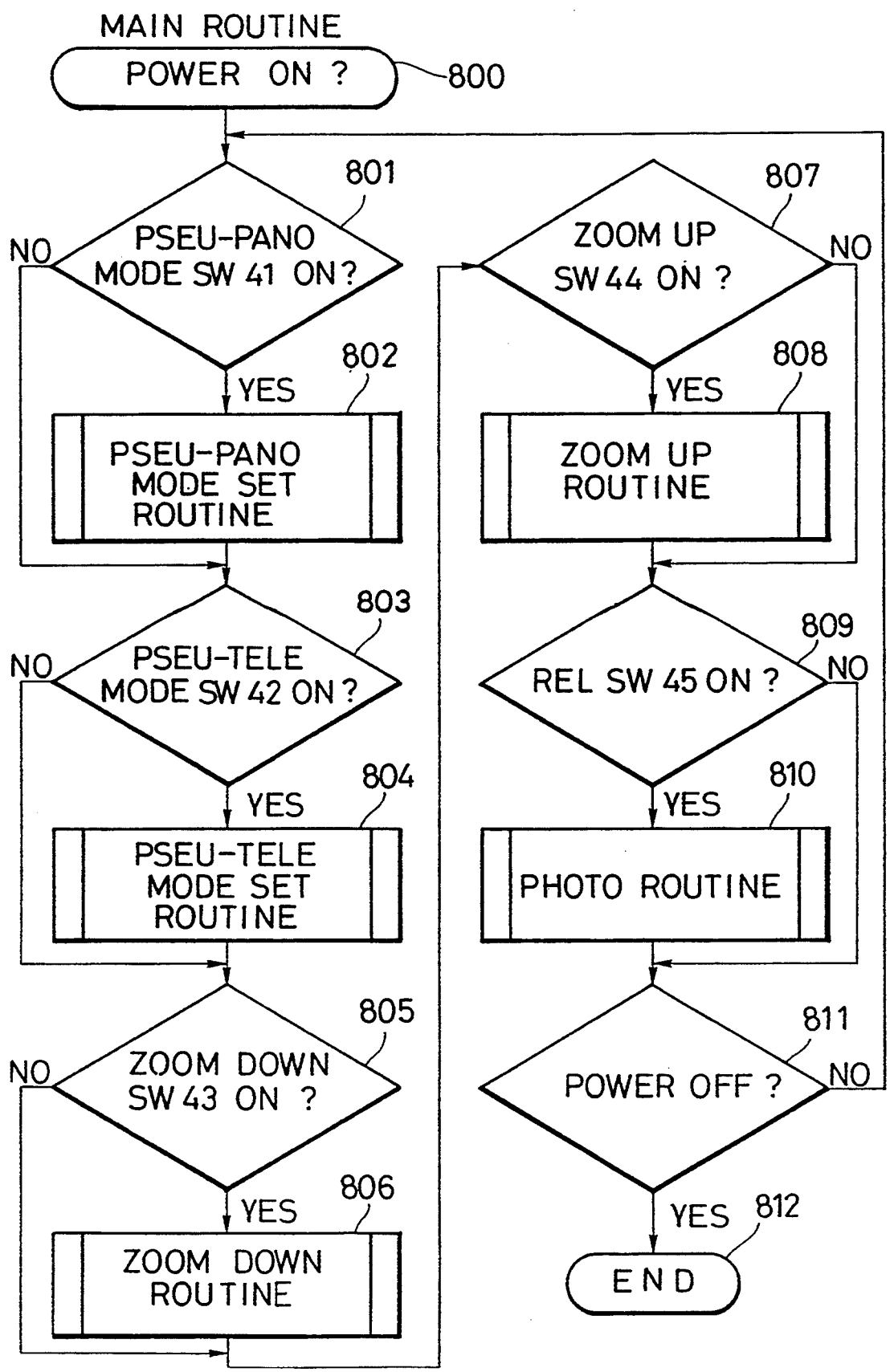
FIG. 12 is a flow chart showing the operation of the main routine.

The flow chart of FIG. 12 shows the operation of the main routine according to another embodiment.

This operation starts with the closing of a power source switch, not shown (step 800).

At the next step 801, whether the pseudo panorama mode setting switch 41 is ON is judged. If this switch 41 is ON, at the next step 802, the pseudo panorama mode setting routine (which will be described later) is executed, and if the switch 41 is not ON, the operation skips to a step 803.

At the step 803, whether the pseudo telephoto mode setting switch 42 is ON is judged. If this switch 42 is ON, at the next step 804, the pseudo telephoto mode setting routine (which will be described later) is executed, and if the switch 42 is not ON, the operation skips to a step 805.

At the step 805, whether the zoom down switch 43 is ON is judged. If this switch 43 is ON, at the next step 806, the zoom down routine (which will be described later) is executed and if the switch 43 is not ON, the operation skips to a step 807.

At the step 807, whether the zoom up switch 44 is ON is judged. If this switch 44 is ON, at the next step 808, the zoom up routine (which will be described later) is executed, and if the switch 44 is not ON, the operation skips to a step 809.

At the step 809, whether the release switch 45 is ON is judged. If this switch 45 is ON, at the next step 810, the photographing routine is executed, and if the release switch 45 is not ON, the operation skips to a step 811.

At the step 811, whether the power source switch, not shown, has been opened is judged. If the power source switch is OFF, the operation of the main routine is terminated (step 812), and if the power source switch is not OFF, the operation returns to the step 801.

Figure 13:
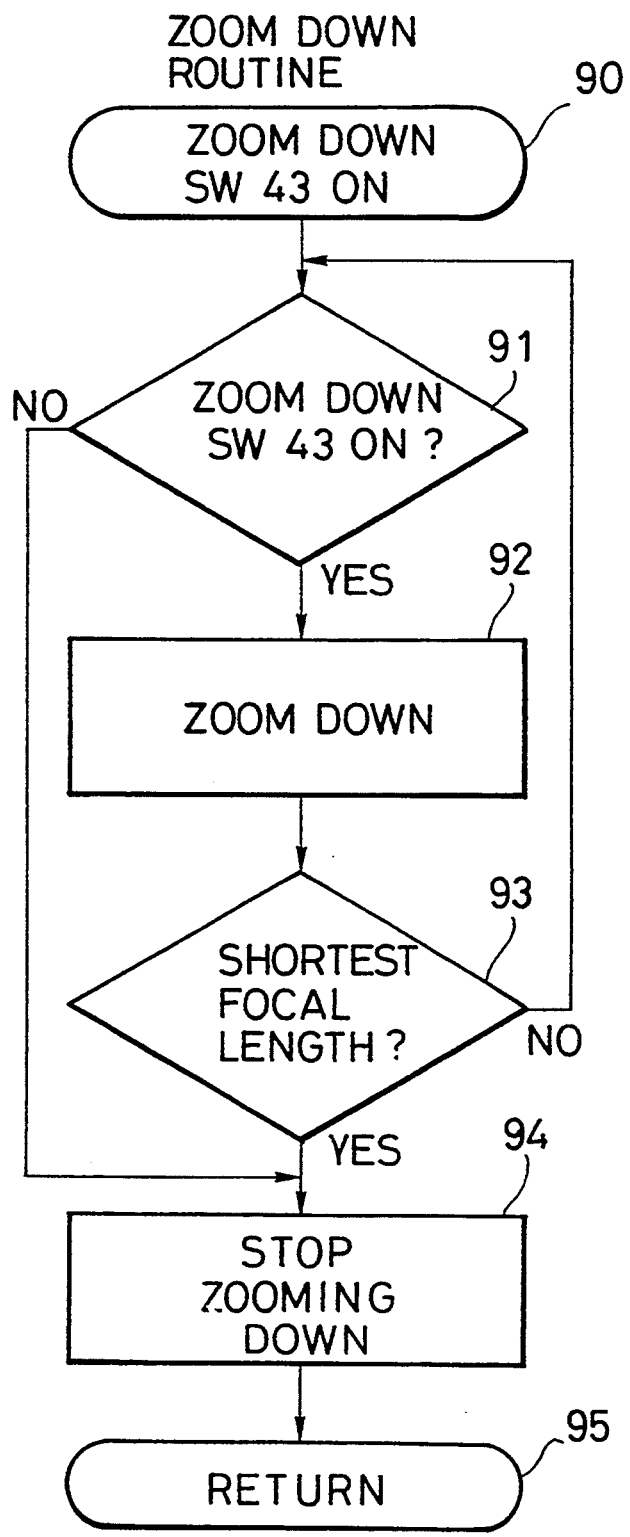
FIG. 13 is a flow chart showing the operation of the zoom down routine.

FIG. 13 shows the operation of the zoom down routine of the step 806 of FIG. 12.

This zoom down routine is started by the zoom down switch 43 being closed (step 90).

At the next step 91, whether the zoom down switch 43 is ON is judged, and if this switch 43 is ON, the operation advances to the next step 92, and if the switch 43 is not ON, the operation skips to a step 94.

At the step 92, the zooming down operation is started. More particularly, the zoom motor 47A is rotated in the forward direction through the zoom motor driving circuit 47 to thereby zoom down the zoom lens 34 toward the shortest focal length position.

At the next step 93, whether the shortest focal length position has been reached is judged from the focal length information of the focal length encoder 46. If that position is reached, the operation advances to a step 94, and if that position is not reached, the operation returns to the step 91.

At the step 94, the zooming down operation is stopped, and at the next step 95, the operation returns to the main routine of FIG. 12.

Accordingly, zooming down is continued until the shortest focal length position is reached, as long as the left side portion 31W of the zoom operating member 31 is pushed, that is, as long as the switch 43 is ON. When the shortest focal length position is reached, the supply of electric power to the motor 47A is cut off even if the switch 43 is ON.

Figure 14:
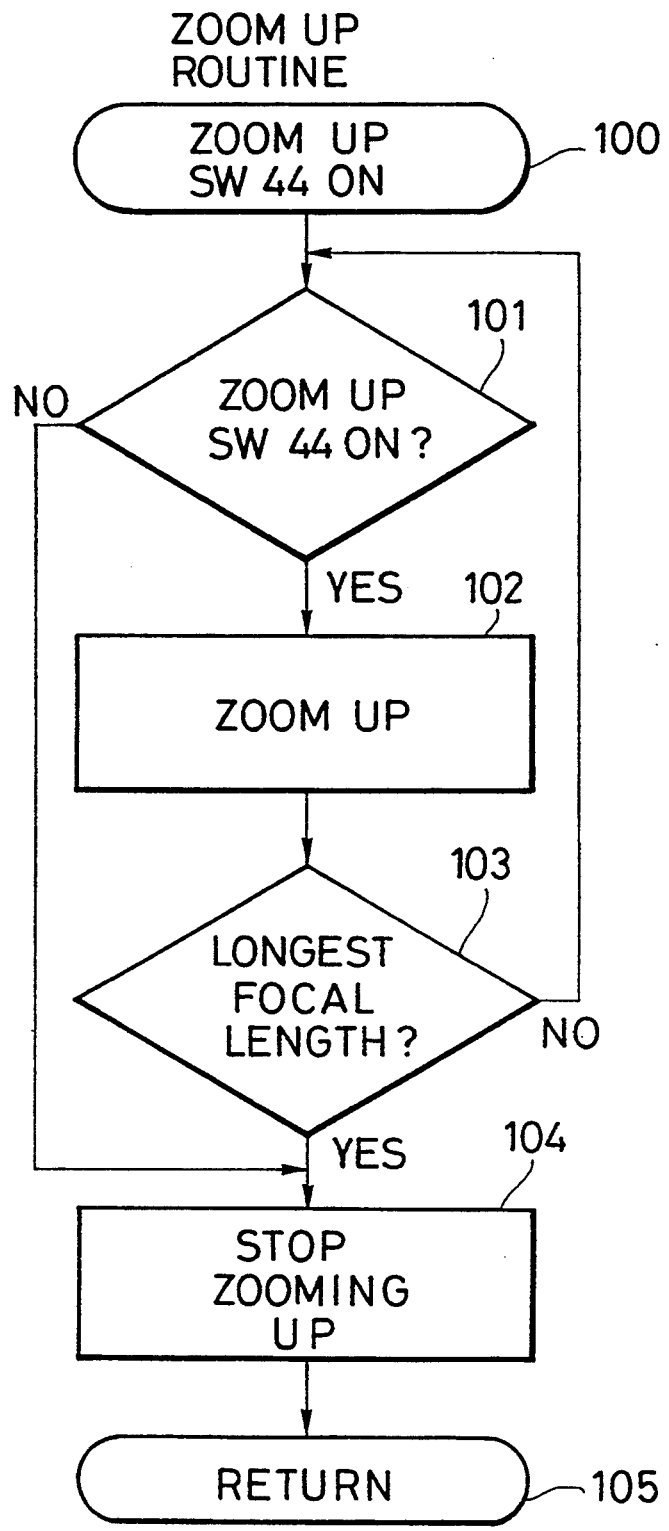
FIG. 14 is a flow chart showing the operation of the zoom up routine.

FIG. 14 shows the operation of the zoom up routine of the step 808 of FIG. 12.

This zoom up routine is started by the zoom up switch 44 being closed (step 100).

At the next step 101, whether the zoom up switch 44 is ON is judged, and if the switch 44 is ON, the operation advances to the next step 102, and if the switch 44 is not ON, the operation skips to a step 104.

At the step 102, the zooming up operation is started. More particularly, the zoom motor 47A is rotated in the reverse direction through the zoom motor driving circuit 47 to thereby zoom up the zoom lens 34 toward the longest focal length position.

At the next step 103, whether the longest focal length position has been reached is judged from the focal length information of the focal length encoder 46. If that position is reached, the operation advances to the step 104, and if that position is not reached, the operation returns to the step 101.

At the step 104, the zooming up operation is stopped, and at the next step 105, the operation returns to the main routine of FIG. 12.

Accordingly, zooming up is continued until the longest focal length position is reached, as long as the right side portion 31T of the zoom operating member is pushed, that is, as long as the switch 44 is ON. When the longest focal length position is reached, the supply of electric power to the motor 47A is cut off even if the switch 44 is ON.

The zooming down operation of FIG. 13 and the zooming up operation of FIG. 14 can be performed, respectively, immediately after the pseudo telephoto mode setting routine of FIG. 6 and the pseudo panorama mode of FIG. 5 have been executed. Accordingly, in a state in which the pseudo panorama mode or the pseudo telephoto mode is set, that is, a state in which the pseudo panorama flag or the pseudo telephoto flag is set, the zoom lens 34 can be displaced from the shortest focal length position or the longest focal length position. Thereby, pseudo panorama photographing at focal lengths other than the shortest focal length and pseudo telephoto photographing at focal lengths other than the shortest focal lengths other than the longest focal length become possible.

What is claimed is:

1. Trimming camera comprising:
    a photographing lens;
    pseudo panorama mode setting means for setting a pseudo panorama mode;
    a wide conversion lens which is arranged to be situated selectively, at a position to intersect or a position not to intersect with a light path which passes through said photographing lens, said wide conversion lens taking said intersecting position in response to the setting of the pseudo panorama mode and thereby executing wide angle photography in cooperation with said photographing lens; and
    input means for inputting pseudo panorama information into a photo image plane recording means on or after the photographing, in response to the setting of the pseudo panorama mode, said pseudo panorama information indicating that an upper and lower part of the photographed frame are to be eliminated when the frame is printed.

2. Trimming camera of claim 1, wherein said photo image plane recording means includes a photosensitive film, said input means includes a light emitting diode, and said pseudo panorama information is input by energizing said light emitting diode and thereby exposing a part of said photosensitive film.

3. Trimming camera of claim 1, wherein said photo image plane recording mean includes a magnetic recording medium, and said input means includes a magnetic head, and said pseudo panorama information is input by energizing said magnetic head and thereby magnetizing a part of said magnetic recording medium.

4. Trimming camera comprising:
    a photographing lens;
    pseudo telescopic mode setting means for setting a pseudo telescopic mode;
    a tele-conversion lens which is arranged to be situated either at a position intersecting or a position non-intersecting with a light path which passes through said photographing lens, said conversion lens taking said intersecting position in response to the setting of the pseudo telescopic mode and thereby conducting telescopic photography in cooperation with said photographing lens;
    input means for inputting pseudo telescopic information into a photo image plane recording means on or after the photographing ink response to the setting of he pseudo telescopic mode, said pseudo telescopic information indicating that only a central part of the photographed frame is to be printed when the frame is printed.

5. Trimming camera of claim 4, wherein said photo image plane recording means includes a photosensitive film, and said input means includes a light emitting diode, and said pseudo telescopic information is input by energizing said light emitting diode and thereby exposing a part of said photosensitive film.

6. Trimming camera of claim 4, wherein said photo image plane recording means includes a magnetic recording, and said input means includes magnetic head and said pseudo telescopic information is input by energizing said magnetic head, and thereby magnetizing a part of said magnetic recording medium.

7. A trimming camera comprising:
    lens means having a focal length variable within a focal length range;
    trimming mode setting means including a switch which is operable irrespective of the focal length of said lens means to set a trimming mode;
    lens driving means including a motor for driving said lens means to an end of the focal length range in response to operation of said switch to set the trimming mode; and
    means for recording trimming information in response to the setting of the trimming mode.

8. A trimming camera comprising:
    a zoom lens;
    pseudo panorama mode setting means including a switch which is operable irrespective of the focal length of the zoom lens to set a pseudo panorama mode;
    lens driving means including a motor for driving said zoom lens to a position of shortest focal length in response to operation of said switch to set the pseudo panorama mode; and
    means for recording pseudo panorama information in response to the setting of the pseudo panorama mode.

9. The trimming camera of claim 8, wherein said camera includes means for producing a photographic image on a photosensitive film, and wherein said recording means includes means for exposing a part of said photosensitive film.

10. The trimming camera of claim 8, wherein said recording means includes means for recording on a magnetic medium.

11. A trimming camera comprising:
    a zoom lens;
    pseudo telephoto mode setting means including a switch operable irrespective of the focal length of the zoom lens to set a pseudo telephoto mode;
    lens driving means including a motor for driving said zoom lens to a position of longest focal length in response to operation at said switch to set the pseudo telephoto mode; and
    means for recording pseudo telephoto information in response to the setting of the pseudo telephoto mode.

12. The trimming camera of claim 11, wherein said camera includes means for producing a photographic image on a photosensitive film, and wherein said recording means includes means for exposing a part of said photosensitive film.

13. The trimming camera of claim 11, wherein said recording means includes means for recording on a magnetic medium.

14. A trimming camera comprising:
    a photographing lens;
    trimming mode setting means for setting a trimming mode;
    a conversion lens;
    means for moving said conversion lens into an optical path of said photographing lens from a position out of said optical path in response to the setting of said trimming mode; and
    means for recording trimming information in response to the setting of said trimming mode.

15. The trimming camera of claim 14, wherein said trimming mode is a pseudo panorama mode and said conversion lens is a wide angle conversion lens.

16. The trimming camera of claim 14, wherein said trimming mode is a pseudo telephoto trimming mode and said conversion lens is a telephoto lens.

17. A trimming camera comprising:
lens means having a focal length which is changeable within a predetermined range;
trimming mode setting means manually operable for setting a trimming mode;
lens driving means for driving said lens means to change the focal length;
control means for causing said lens driving means to start driving said lens means toward an end of said predetermined range in response to the manual operation of said trimming mode setting means, and to continue driving said lens means to said end of said predetermined range even if manual operation of said trimming mode setting means is terminated before said lens means reaches said end of said predetermined range; and
input means for inputting trimming information into a photo image plane recording means on or after photographing, in response to the setting of the trimming mode, said trimming information indicating a part of a photograph frame to be trimmed during printing.

18. A trimming camera comprising:
a zoom lens;
pseudo panorama mode setting means for setting a pseudo panorama mode;
lens driving means for driving said zoom lens means to change a focal length thereof;
control means for causing said lens driving means to start driving said lens means toward a position of shortest focal length in response to the manual operation of said trimming mode setting means, and to continue driving said lens means to said position of shortest focal length even if manual operation of said pseudo panorama mode setting means is terminated before said lens means reaches said position of shortest focal length; and
input means for inputting pseudo panorama information into a photo image plane recording means on or after photographing, in response to the setting of the pseudo panorama mode, said pseudo panorama information indicating an upper and a lower part of the photographed frame to be eliminated when the frame is printed.

19. The trimming camera of claim 18, wherein said photo image plane recording means includes a photosensitive film, said input means includes a light emitting diode, and said pseudo panorama information is input by energizing said light emitting diode and thereby exposing a part of said photosensitive film.

20. The trimming camera of claim 18, wherein said photo image plane recording means includes a magnetic recording medium, said input means includes a magnetic head, and said pseudo panorama information is input by energizing said magnetic head and thereby magnetizing a part of said magnetic recording medium.

21. A trimming camera comprising:
a zoom lens;
pseudo telescopic mode setting means manually operable for setting a pseudo telescopic mode;
lens driving means for driving said zoom lens to change a focal length thereof;
control means for causing said lens driving means to start driving said lens means toward a position of longest focal length in response to the manual operation of said trimming mode setting means, and to continue driving said lens means to said position of longest focal length even if manual operation of said pseudo telescopic mode setting means is terminated before said lens means reaches said position of longest focal length; and
input means for inputting pseudo telescopic information into a photo image plane recording means on or after photographing, in response to the setting of the pseudo telescopic mode, said pseudo telescopic information indicating that only a central part of the photographed frame is to be printed when the frame is printed.

22. The trimming camera of claim 21, wherein said photo image plane recording means includes a photosensitive film, said input means includes a light emitting diode, and said pseudo telescopic information is input by energizing said light emitting diode and thereby exposing a part of said photosensitive film.

23. The trimming camera of claim 21, wherein said photo image recording means includes a magnetic recording medium, said input means includes a magnetic head, and said pseudo telescopic information is input by energizing said magnetic head and thereby magnetizing a part of said magnetic recording medium.

* * * * *